(12) United States Patent
Smith et al.

(10) Patent No.: US 8,225,079 B2
(45) Date of Patent: *Jul. 17, 2012

(54) ACCELERATING SYSTEM BOOT USING A SET OF CONTROL DATA RECORDED BY OPERATING SYSTEM DURING A FIRST OS BOOT

(75) Inventors: Mike Smith, Berkeley, CA (US); Joseph Sokol, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 12/567,516

(22) Filed: Sep. 25, 2009

(65) Prior Publication Data

US 2010/0017591 A1 Jan. 21, 2010

Related U.S. Application Data

(63) Continuation of application No. 10/437,645, filed on May 13, 2003, now Pat. No. 7,607,000.

(51) Int. Cl.
*G06F 9/00* (2006.01)
*G06F 9/24* (2006.01)
*G06F 15/177* (2006.01)

(52) U.S. Cl. ............... 713/1; 713/2; 713/100; 711/162; 711/165

(58) Field of Classification Search .............. 713/1, 2, 713/100; 711/162, 165
See application file for complete search history.

(56) References Cited

U.S. PATENT DOCUMENTS

| | | |
|---|---|---|
| 5,269,022 A | 12/1993 | Shinjo et al. |
| 5,822,773 A | 10/1998 | Pritchard et al. |
| 5,873,118 A | 2/1999 | Letwin |
| 5,920,896 A | 7/1999 | Grimsrud et al. |
| 5,933,630 A | 8/1999 | Ballard et al. |
| 6,014,744 A | 1/2000 | McKaughan et al. |
| 6,073,232 A | 6/2000 | Kroeker et al. |
| 6,202,121 B1 | 3/2001 | Walsh et al. |
| 6,314,494 B1 | 11/2001 | Keltcher et al. |
| 6,347,370 B1 | 2/2002 | Grimsrud |
| 6,434,663 B1 | 8/2002 | Grimsrud et al. |
| 6,920,533 B2 | 7/2005 | Coulson et al. |

(Continued)

OTHER PUBLICATIONS

Woods Hole Oceanographic Institution Compuer and Information Services, "Macintosh Startup Sequence," Troubleshooting the Startup Sequence, pp. 1-3, Feb. 11, 2003.

(Continued)

*Primary Examiner* — Vincent Tran
(74) *Attorney, Agent, or Firm* — Blakely, Sokoloff, Taylor & Zafman LLP

(57) ABSTRACT

A method for accelerating an operating system boot process is disclosed. In one exemplary embodiment, during a first operating system boot, information regarding the physical locations of disk access performed by the operating system to complete the boot are recorded and stored in a control data file. The control data file is used during a second operating system boot to predict which data will be required during the second operating system, and to populate a cache with that data. The cache can then be used to improve the second operating system boot to improve the boot time. In one embodiment, the information is independent of a file system of the operating system. In another embodiment, the cache can be populated by copying data from a mass storage device to a cache, and when the data is used, it can be moved from the cache to another cache.

60 Claims, 10 Drawing Sheets

U.S. PATENT DOCUMENTS

| | | | |
|---|---|---|---|
| 7,185,188 | B2 | 2/2007 | Zimmer et al. |
| 7,299,346 | B1 * | 11/2007 | Hollis ................................ 713/2 |
| 7,607,000 | B1 * | 10/2009 | Smith et al. ........................ 713/1 |
| 2002/0069354 | A1 | 6/2002 | Fallon et al. |
| 2002/0169950 | A1 | 11/2002 | Esfahani et al. |
| 2003/0005223 | A1 | 1/2003 | Coulson et al. |
| 2003/0088591 | A1 | 5/2003 | Fish |
| 2003/0142561 | A1 | 7/2003 | Mason et al. |
| 2003/0233533 | A1 | 12/2003 | Avraham |
| 2005/0071617 | A1 | 3/2005 | Zimmer et al. |

OTHER PUBLICATIONS http://www.whoi.edu/CIS/services/desktop/macintosh/about/startup_sequence.html.

Apple Copmuter, Inc., "New World Boot Process," pp. 1,2, Feb. 11, 2003, http://www.developer.apple.com/techpubs/hardware/DeviceManagers/pci_sr.../PCI_BOOK.36.htm.

Apple Computer, Inc., "Technical Note TN 1167, The Mac ROM Enters a New World," pp. 1-6, Feb. 11, 2003, http://developer.apple.com/technotes/tn/tn1167.html.

Gerbarg, "BootX: The Mac OS X Bootloader," pp. 1-16.

Apple Computer, Inc., "System Initialization and Startup," pp. 1-7, Feb. 11, 2003, http://developer.apple.com/techpubs/mac/OSUtilites/OSUtilities-189.html.

Apple Computer, Inc., "The Startup Process," Macintosh Guide: Inside Macintosh: The Startup Process, pp. 1-4, http://www.yale.edu/macguide/System/Startup.html.

Anonymous, Windows Platform Design Notes, "Fast System Startup for PCs Running Window XP," pp. 1-27, Jan. 31, 2002.

Russinovich, et al., "Windows XP: Kernel Improvements Create a More Robust, Powerful, and Scalable OS," pp. 1-14, May 28, 2003, http://msdn.microsoft.com/msdnmag/issues/01/12/XPKernel/default.aspx.

Amanzon.com, "Microsoft Windows XP Inside Out: Explore similar items," pp. 1-3, May 28, 2003, http://www.amazon.com/exec/obidos/ASIN/0735613826/bottom-20/102/102-9149221-7865766.

Microsoft Corporation. "Memory Management Ehnancements," pp. 1-3, Aug. 8, 2003, http://msdn.microsoft.com/library/en-us/appendix/hh/appendix/enhancements5_3oc3.asp?frame=true.

* cited by examiner

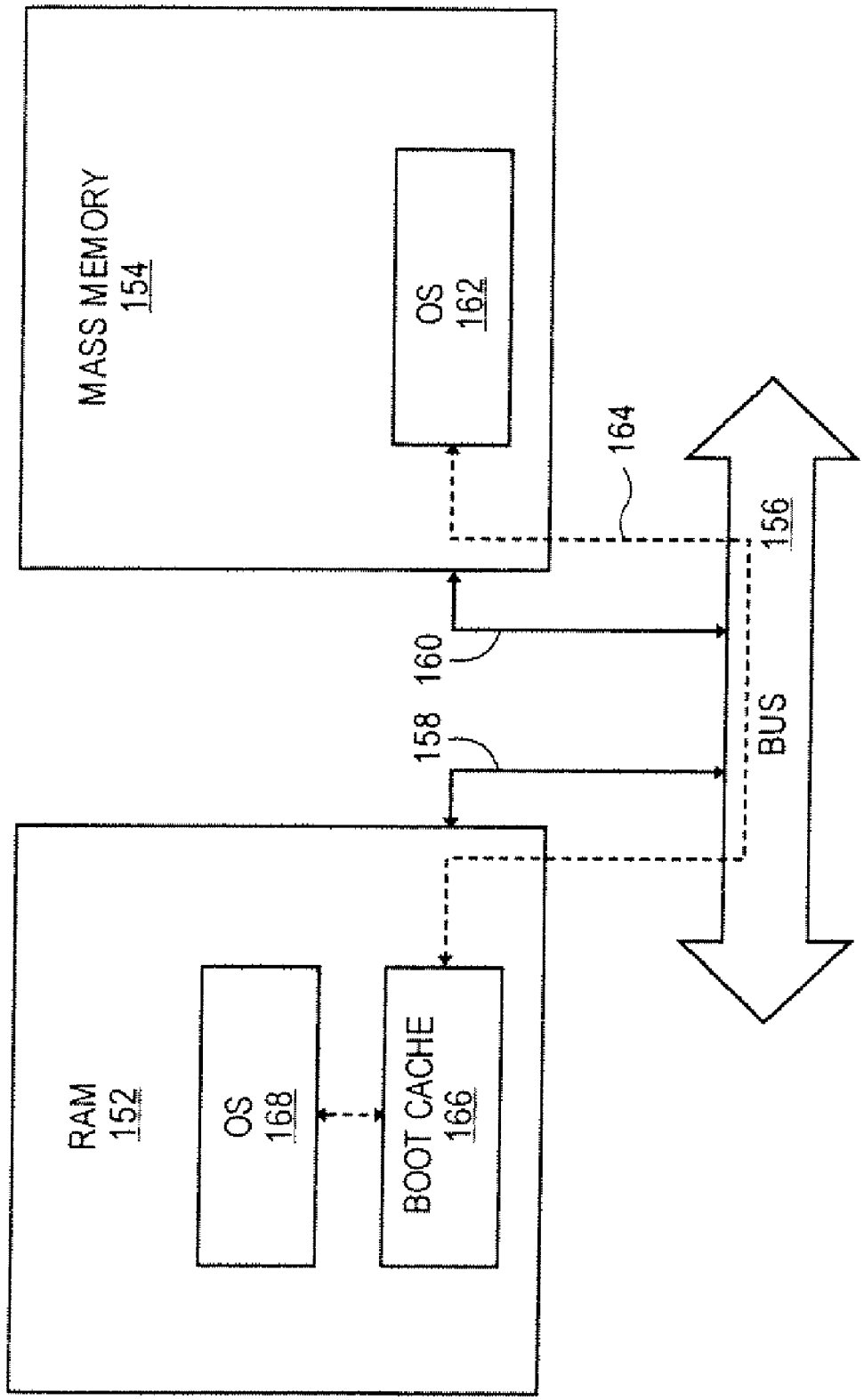

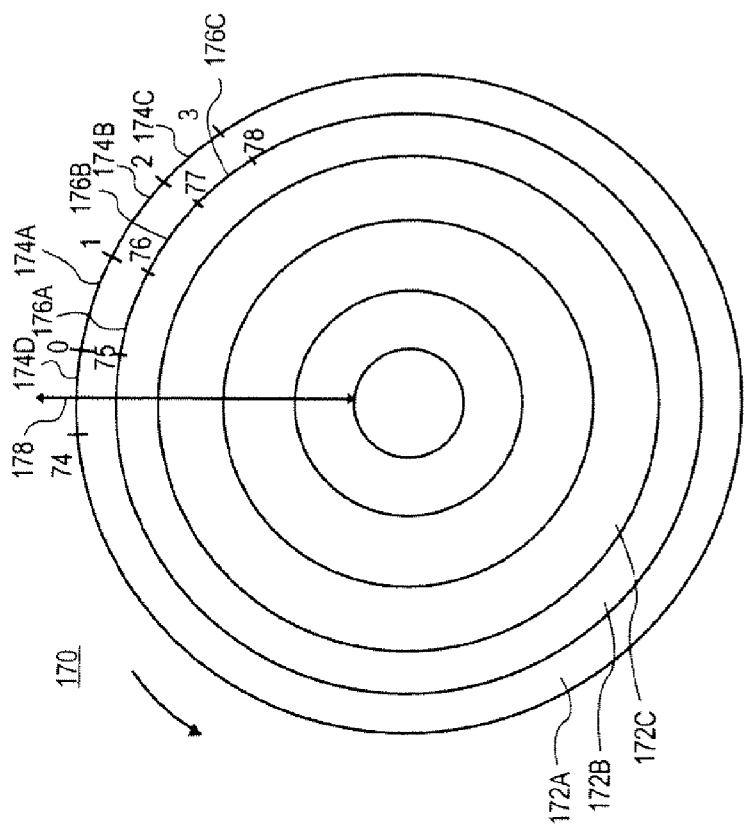
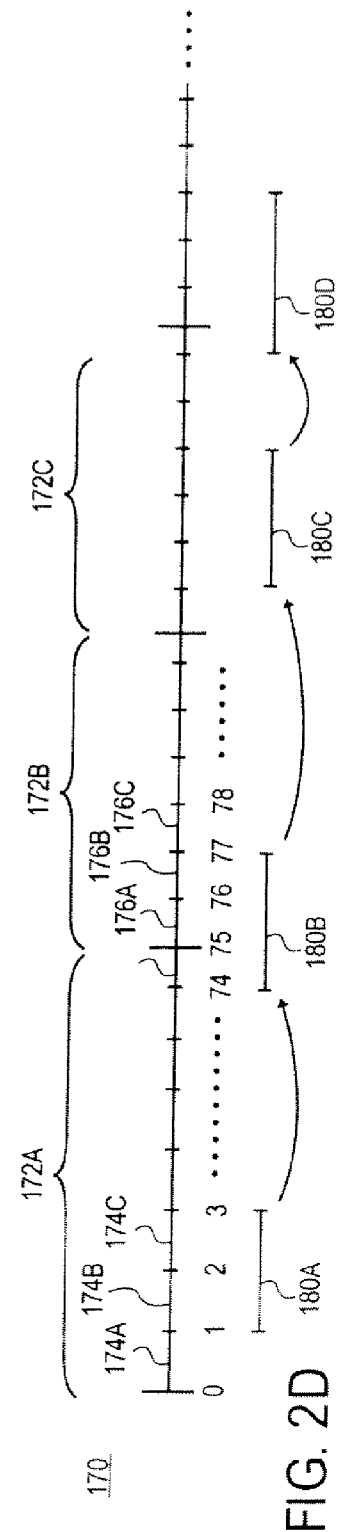
FIG. 2C
FIG. 2D

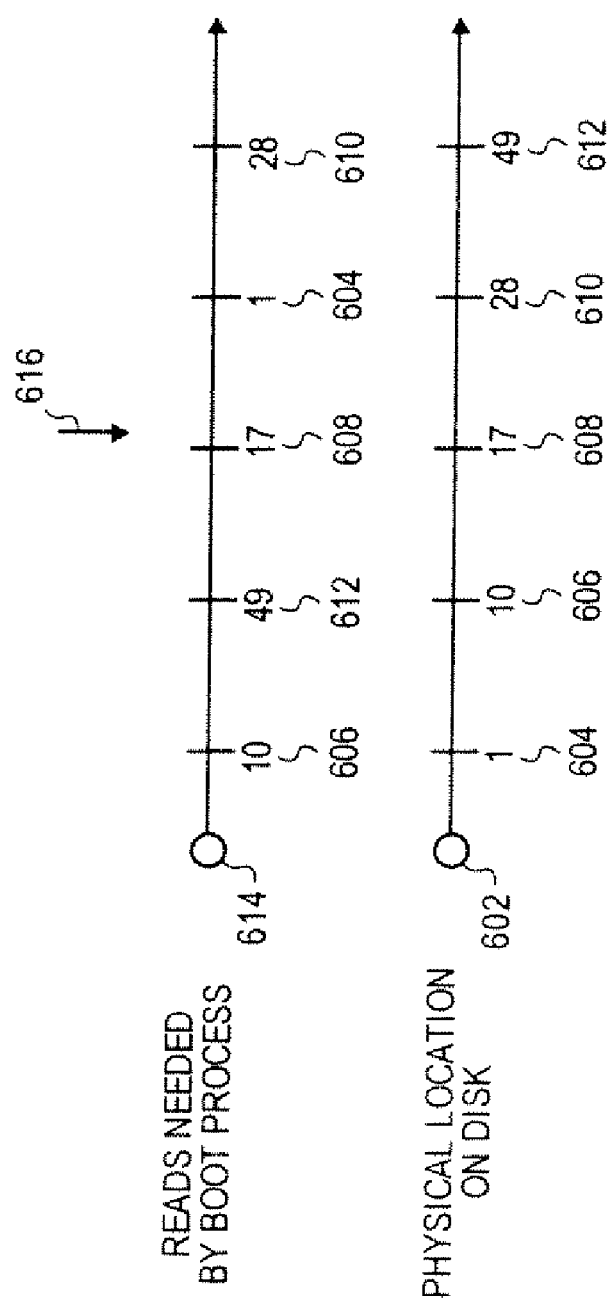

ACCELERATING SYSTEM BOOT USING A SET OF CONTROL DATA RECORDED BY OPERATING SYSTEM DURING A FIRST OS BOOT

This application is a continuation of U.S. patent application Ser. No. 10/437,645, filed on May 13, 2003, now U.S. Pat. No. 7,607,000, which is incorporated by reference herein in its entirety.

FIELD OF THE INVENTION

The invention relates to computer software in general and specifically to the booting of operating systems.

BACKGROUND

An operating system (OS) is a program that controls the function of a computing device and manages other programs running on the computing device. An OS can also provide an interface for a user to interact with a computer. An OS is typically launched when a computer system is started, and can allow the computer to run programs, manage files, and control peripheral devices. Examples of operating systems include the Macintosh OS by Apple Inc. of Cupertino, Calif., the Windows OS by Microsoft of Redmond, Wash., and the Unix OS.

An OS is often stored on a mass memory storage device, such as a hard drive or Compact Disc-Read Only Memory (CD-ROM), and is loaded into a memory once a computer is turned on by a user. The process of starting a computer and loading an OS so that the computer is ready to use is known as booting. An boot sequence can take up to two minutes or more to complete. This is because of increasingly complex and large operating systems that are now being used with computers. When a computer boots, large amounts of data must be copied from a mass storage device, such as a hard drive, into a memory, such as a random access memory (RAM). The mass storage device has a much slower data transfer rate than the remainder of the computer system and is usually the bottleneck that increases boot times. Processors typically must wait for data to be transferred from a mass storage device to a memory before the data can be used. Computer users now expect more appliance-like behavior from their computers, which requires a system to be ready soon after it is turned on. It is therefore desirable to reduce the amount of time necessary for an OS to boot.

FIG. 1 is a flowchart which illustrates a typical computer boot sequence. The process 10 detailed here is typical for computer systems. At block 12, the user starts a computer by, for example, pressing an "on" button, and the boot process or boot sequence begins. At block 14, the computer initializes various hardware, such as a microprocessor, memories, hard drives, display adapters, and input/output (I/O) adapters. The hardware initialization in block 14 may be performed by a basic input/output system (BIOS), which is often stored in a semiconductor read only memory. In block 16, the computer searches for a boot device. A boot device is a device containing the code that will boot a computer system, and may be a device such as a floppy disk, a hard drive, or a CD-ROM. In block 18, a system file is loaded from the boot device. A system file contains the core of the operating system that will be loaded into memory and will control a computer system. At block 20, the operating system which was started in block 18 loads various extensions. Extensions allow the operating system to communicate with peripheral devices such as displays, printers, keyboards, mice, or other I/O devices. After the extensions are loaded, the operating system searches for and loads start up items in block 22. Start up items include programs that the user, the operating system, or other programs have designated to be started when the system boots. Once the operating system has loaded the start up items, the process 10 moves on to block 24 where the computer system is ready for the user.

As can be seen in FIG. 1, there are several steps that are necessary to boot a computer system. These several steps can often be quite time consuming and can lead to a lengthy boot time. It is therefore desirable to reduce the amount of time necessary to progress from block 12 to block 24, or to reduce the amount of time that it takes for a computer system to be ready for user input after a user turns the computer system on.

SUMMARY

A method for accelerating an operating system boot is disclosed. During a first operating system boot process, information regarding the physical locations of disk accesses performed by the operating system to complete the boot process are recorded and stored in a control data file. The control data file is used during a second operating system boot process to predict which data will be required during the second operating system boot process, and to populate a cache with that data. The cache can then be used to reduce the time required for the second operating system boot process. In one embodiment, the information is independent of a file system of the operating system. In another embodiment, the cache can be populated by copying data from a mass storage device to a cache, and when the data is used, it can be moved, rather than copied, from one memory location to another memory location.

In another embodiment, two separate caches may be created and used in a single OS boot process. Other exemplary methods are also disclosed.

Machine readable media and apparatuses which perform these methods are also disclosed.

BRIEF DESCRIPTION OF THE DRAWINGS

FIG. 2b illustrates a relationship between a RAM and a mass memory.

FIG. 2c illustrates the storage of data on a mass storage device.

FIG. 2d illustrates a disk in a logical fashion.

FIG. 7 illustrates a marker to separate two read passes during a boot process.

DETAILED DESCRIPTION

Described herein are methods for booting an operating system and systems and apparatuses which use this method.

In the following description, numerous specific details are set forth. However, it is understood that embodiments may be practiced without these specific details. For example, well-known equivalent processes may be used in place of those described herein. In other instances, well-known processes have not been shown in detail in order not to obscure the understanding of this description.

An individual computer system typically requires the same or very similar data during every boot sequence. Therefore, an operating system can predict which data will be necessary for any particular boot sequence by analyzing which data was used during previous boot sequences. During each boot sequence, the operating system can accumulate a list of the physical locations of data that were required by the boot sequence. Depending the accuracy of the previous list, either this list can then be merged with the previous list, or it can replace the previous list. During a subsequent boot sequence, the operating system can use the list to populate a cache so that the operating system can access the data required for the previous boot sequence from a memory. Because the cache will be located in a memory that will have a much quicker access time than a disk on which the data are typically stored, the boot process will progress more quickly, and the total time required for a computer system to boot will be reduced. Further, because the data are referenced by their physical locations on the disk (mass memory) storing the operating system, the operating system can directly access the data, and any caching scheme created according to this methodology can be portable between different operating systems.

Figure 1:
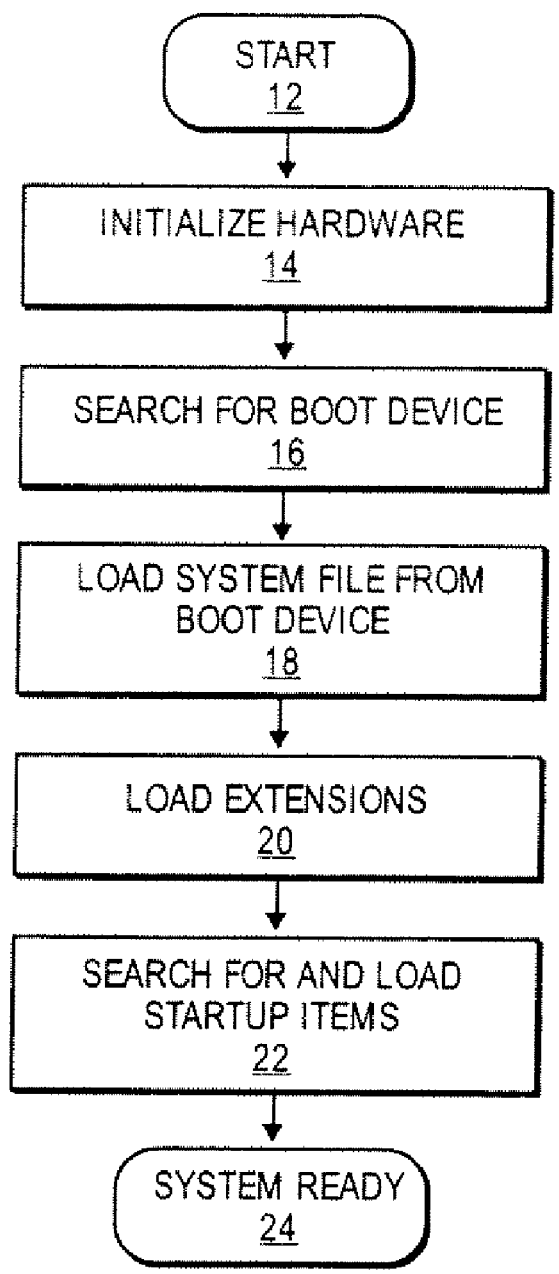
FIG. 1 is a flowchart which illustrates a typical computer boot sequence.
Figure 2A:
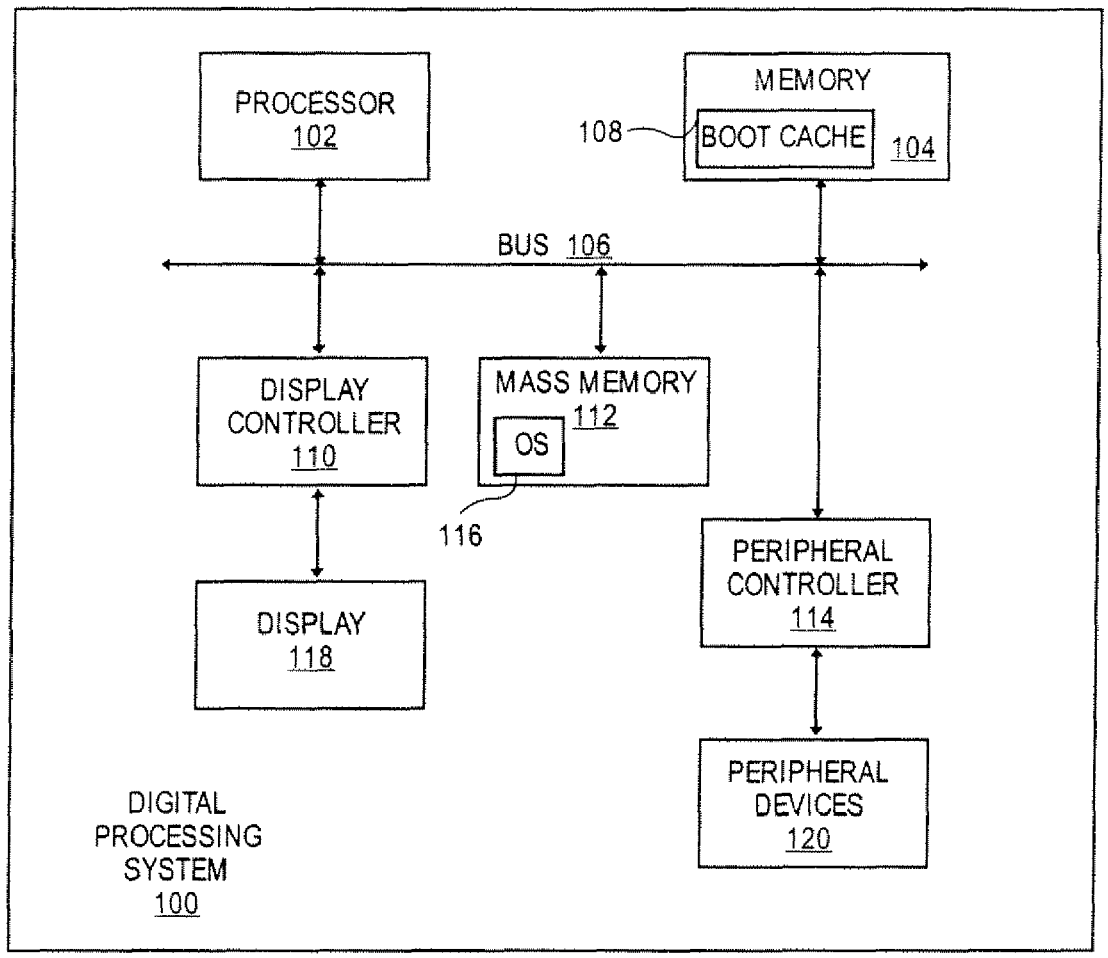
FIG. 2a is a block diagram of a digital processing system which may be used to run an operating system, in accordance with one embodiment.

FIG. 2a is a block diagram of a digital processing system which may be used to run an operating system, in accordance with one embodiment. For example, the digital processing system 1 may be a computer running a Macintosh operating system, a Windows operating system, a Unix operating system, etc. The digital processing system 100 includes a processor 102 which may represent one or more processors and may include one or more conventional types of processors, such as a Motorola Power PC processor an Intel x86 processor, etc. A Memory 104 is coupled to the processor 102 by a bus 106. The memory 104 may further include a portion of physical memory which is set aside to use as a bootcache 108 for holding certain data needed during an operating system boot. The memory 104 may be a semiconductor dynamic random access memory (DRAM) and/or a static ram (SRAM). The processor may also be coupled to other types of storage areas/memories such as flash memory, a disk drive, etc.

The bus 106 further couples the processor 102 to a display controller 110, a mass memory 112, and a peripheral controller 114. The mass memory 112 may be a hard drive, an optical drive such as a CD-ROM, etc. An operating system 116 is stored on the mass memory 112. The mass memory 112 is typically a persistent storage device, as it retains stored data even when power is not applied to the mass memory 112. The display controller 110 controls a display 118 which may be a cathode ray tube (CRT) display, a liquid crystal display (LCD), a plasma display, etc. The peripheral controller 114 controls peripheral devices 120, which may include keyboards, mice, other pointing devices, digital cameras, scanners, etc.

It will be appreciated that the digital processing system 100 represents only one example of a system, which may have many different configurations and architectures, and which may be employed with the embodiments of the present invention. For example, Macintosh and other systems often have multiple buses, such as a peripheral bus or a dedicated cache bus.

FIG. 2b illustrates a relationship between a RAM, such as memory 104, and a mass memory, such as mass memory 112. The RAM 152 is coupled with the mass memory 154 through a bus 156. The connection lines 158 and 160 couple the RAM 152 and the mass memory 154 with the bus 156. An operating system 162 is stored on the mass memory 154. The mass memory 154 may be, for example, a hard drive which is selected as a boot device on a computer system.

The operating system 162 is stored on the mass memory device 154 and is initialized when the computer boots. The operating system 162 contains a set of commands used to control a computer system. In one embodiment, an operating system 162 creates a bootcache 166 in the RAM 152. A bootcache 166 may be established in any memory, including a cache memory. The bootcache 166 is a cache used to hold data temporarily while an operating system is booting in order to help reduce boot times. The bootcache 166 is shown here located in a RAM, but the bootcache 166 may be established in any type of memory, such as for example high speed memory, which provides faster booting processes relative to a traditional process of loading the OS from mass memory 154.

The data required for a boot sequence on a specific computer system typically does not vary very much over time, although it can change as application programs or extensions are added, modified, or removed from the computer system. In this way, the operating system 162 can often predict what data will be needed for any particular system boot process. In one embodiment, data that are known to be needed to boot an OS 162 can be copied from the mass memory 154 to the bootcache 166 before they are needed by the boot process. Then, when the data are needed, they can be accessed from the RAM 152, which has a much quicker access rate than the mass memory 154. During the boot process, when the data stored in the bootcache 166 are needed, they can be moved into another memory location such as another cache or a file system cache, which may be found in the RAM 152 or other memory. Once the boot process is complete, the bootcache 166 may be erased to free up memory locations in the RAM 152. The operating kernel of the OS 168 is, in one exemplary embodiment, located in the RAM 152 once the boot is complete.

FIG. 2e illustrates the storage of data on a mass storage device. The disk 170 may be, for example, a platter as used in a hard disk drive. Although only a single disk 170 is illustrated in FIG. 2c, it is understood that a drive may contain several platters, and that a single disk 170 is shown for simplicity. A CD-ROM disk will have a physical structure different from that shown here, however, for the purposes of explaining this embodiment, a CD-ROM or other mass media works in a similar manner. It is understood that the several different types of storage media employ many different manners of storing data, and that even among one type of storage media there may be significant structural differences between particular media. These embodiments are not limited to the use of the exemplary structure as disclosed herein, and several different types of media may be used.

The disk 170 contains several concentric tracks 172a, 172b, 172c, etc. The number of tracks on a particular disk may vary from drive to drive, depending on capacity and manufacturer. Each of the tracks 172a-c contains several blocks that can physically store data. For example, the track 172a holds the blocks 174a, 174b, 174c, 174d, etc., and the track 172b contains the blocks 176a, 176b, 176c, etc. The block 174a is labeled with a physical address "0". Similarly, the blocks 174b and 174c have the labels "1" and "2," respectively. The track 172a, as shown here, has 75 blocks. Therefore, the last block on the track 172a is the block 174d, which is given the designation "74." Likewise, the blocks 176a-c on the next track 174b, are labeled "75," "76," and "77." An operating system considers the disk 170 as a logical structure. As such, the logical structure of the disk 170 has a beginning and an end. A head 178 moves along a fixed path across the disk 170. The head 178 can read or otherwise manipulate the data stored on the disk 170. The disk 170 rotates, so that the head 178 can read all of the blocks on a specific track. As the disk 170 rotates, and the head 178 moves along the disk 170, the head 178 can cover every block on the disk 170. When the head 178 reaches the end of a particular track (such as the block 174d), the head 178 will move to the next track. If the head 178 is moving along the track 172a, and reaches the block 174d, the head 178 will continue on to the track 172b and the block 176a. Therefore, the operating system sees the disk 170 and its tracks linearly. This will be illustrated in FIG. 2d.

FIG. 2d illustrates the disk 170 in a logical fashion. The disk 170, as shown in FIG. 2d may be thought of as the disk 170 in a linear fashion, with the beginning of the disk 170 at the left end, and moving toward the end of the disk 170 at the right end. The operating system views the disk 170 in this manner. The block 174a is logically the first block on the disk 170. As FIG. 2d shows, the track 172a, including the blocks 174a-d, is the first track on the disk 170. The tracks 172b and 172c follow the track 172a in the logical order. As can also be seen, the block 174d immediately precedes the block 176a in the view of the operating system, even though they are on different tracks.

A read is an action performed by the operating system to retrieve data from a mass storage device. In this implementation, a read may retrieve one or more logically contiguous blocks. On a hard disk drive, such as the disk 170, this range of logically contiguous blocks may reside on one or more physical tracks. The disk drive will position the head 178 as required to cover the requested blocks. The cost of performing a read may be computed as the time taken to move the head 178 to the track containing the first logical block to be read, plus the time taken to read the blocks, plus the time taken to reposition the head 178 to subsequent tracks as required to cover all of the requested blocks. With current disk drive technology, the time taken to position the head 178 is proportional to the physical distance it must travel. This time is large when compared with the time taken to read the amount of data typically requested from a single physical location by an operating system. Thus it may be seen that if a number of reads are to be performed that efficiency may be improved by performing them in an order which requires the shortest total head travel distance. The process of populating a cache of disk data may require many read operations. This provides an opportunity to maximize efficiency for a large number of read operations by performing them in optimally sorted groups, referred to as read passes. For example, the reads 180a, 180b, 180c and 180d may be required to populate some portion of the cache. From the preceding explanation, it can be seen that performing these reads in the order 180a, 180b, 180c and 180d will require the least movement of the head and thus be more efficient than any other ordering.

Figure 3:
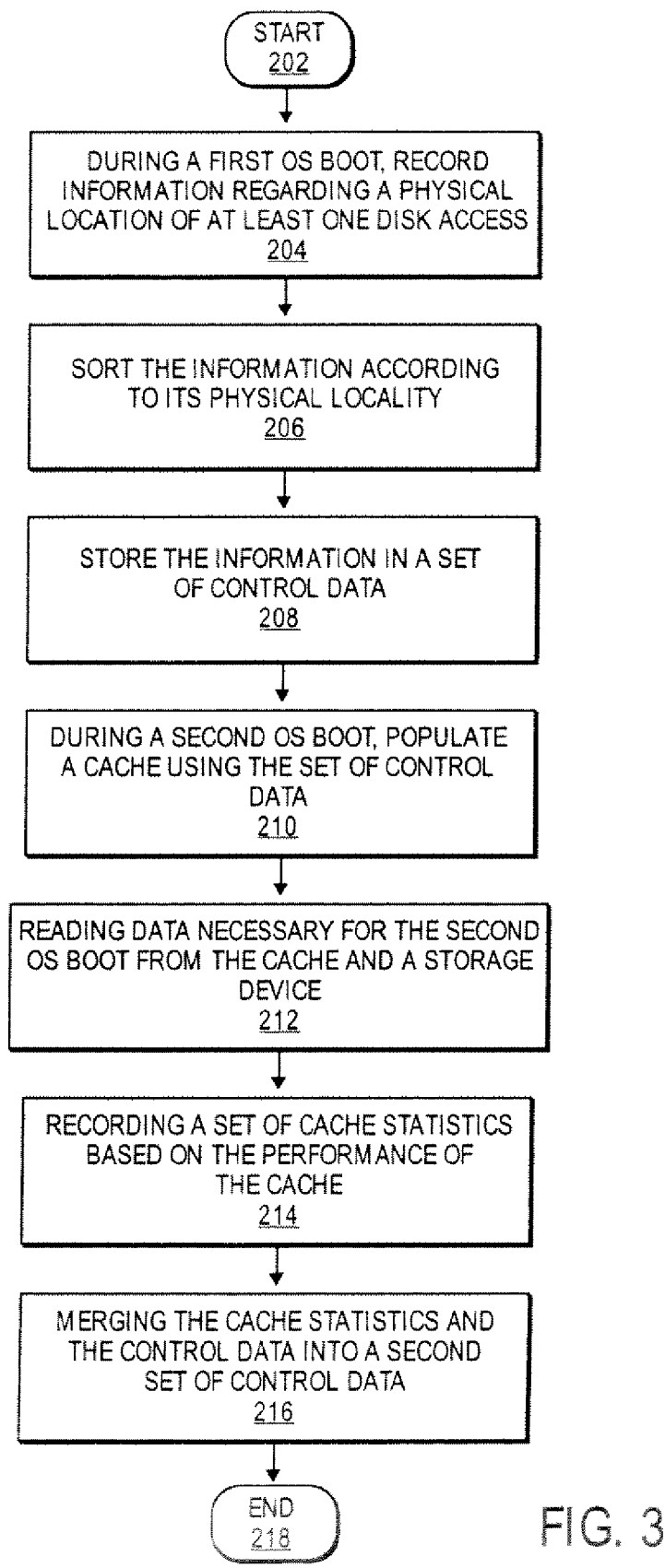
FIG. 3 is a flowchart that illustrates the use of a bootcache during a boot process.

FIG. 3 is a flowchart that illustrates the use of a bootcache during a boot. In one embodiment, the OS compiles a control data file, which contains information regarding data access during a first OS boot, which may be a prior OS boot process. The control data file may be alternatively referred to as a playlist. The control data file can be used during subsequent boots to improve hoot times, because the OS can use the control data file to determine what data are needed for the boot before they are needed, and then the data can be loaded from a mass memory into a RAM or other high speed memory before they are needed.

At start block 202, a computer system is started. At block 204, during a first OS boot (which may be a prior OS boot process rather than the first time the computer is ever booted), information is recorded regarding a physical location of at least one disk access. The first OS boot proceeds as it normally would. The information regarding a physical location of disk accesses is obtained by monitoring the activity of the boot process and recording the location of the data accessed during the boot sequence. The disk accesses may be, for example, reads or read passes performed by the operating system to retrieve data necessary for an OS boot. The physical location of the at least one disk access refers to a physical location on a disk or other mass memory device as illustrated in FIGS. 2c and 2d. The information recorded regarding physical location is independent of any file system that may be associated with an operating system which is booting, and therefore refers to a physical address on a disk rather than a call to a file system to access a physical address on a disk. In this way, an operating system utilizing this method may be more efficient and boot in less time because the operating system can access the disk directly rather than sending a request to and having a file system access the data. Thus, in one exemplary embodiment, software, which executes a method based on FIG. 3 or FIG. 4, can retrieve the control data (e.g., a playlist) from the mass memory and store the control data in RAM. The software can then retrieve the data needed to boot (as indicated by the control data) and store that data in a cache of the RAM (e.g., the bootcache 166), all without relying on an operational file system. Hence, the bootcache can be populated before an operational file system is loaded from mass memory into RAM. In fact, the software for the file system of the OS being booted may be part of the data in the bootcache. The first OS boot may also use this information to predict and load data that will be necessary, although this process will be explained with regards to a subsequent boot in blocks 210 and 212.

In block 206, the information regarding the physical location of the at least one disk access is sorted according to its physical locality. As noted above, the physical location of a piece of data refers to its relative physical position on a mass memory such as a hard drive. FIG. 2d illustrates the relative positioning of blocks of data on a mass memory. A benefit of sorting information according to physical locality is reducing the number of head movements when accessing the information to be stored in a bootcache. By ordering these accesses by physical location on the disk, for example by starting at the logical beginning of the disk and progressing towards the logical end of the disk, the operating system can increase efficiency because a single read pass will result in the shortest set of head movements, requiring less total time than any other combination of accesses.

When ordering the information it may also be desirable to sort the information by a temporal locality. The temporal locality refers to a piece of data's position in a list of data need by the boot sequence, starting with the first piece of data. The first piece of data required by boot sequence may not physically be the first piece of data located on a disk or other mass memory device. An OS may not be able to complete a single, physically ordered read pass before a specific piece of data, which may be logically located near the end of a disk, is needed. Therefore, it may be desirable to order the information regarding the disk reads according to both a temporal and a physical locality, because a piece of data required early in the boot sequence may be physically located near the end of the disk. This may ultimately require multiple disk read passes, and a suitable number of disk read passes will have to be chosen in order to reduce the total boot time. This will be discussed further with regards to FIG. 5.

In block 208, the information regarding the physical location of at least one disk access is stored in a set of control data, and the information may be sorted in one embodiment as noted in block 206. The set of control data indicates to the operating system during subsequent boots which disk reads and what data will be required in order to boot the computer. This set of control data can then be used to access and move the data required for the boot from a mass memory to a bootcache in a RAM or other memory. The set of control data can be stored in a control data file.

Blocks 204, 206 and 208 refer to a process which occurs during a first OS boot (which may be a prior OS boot process). During the first boot, the operating system stores information about what data was accessed during that first boot. This information is then stored in a control data file. This information may be used in subsequent operating system boots to improve efficiency by allowing the operating system to load data which the operating system knows to be necessary into a cache, so that the operating system may have this data accessible from a memory rather than a mass storage device. As noted above, the first OS boot may also use a previously determined control data file to load data into a bootcache, and the first OS boot can still accumulate a current control data file based on the actual needs of the current boot. Thus, an exemplary embodiment is dynamic in that subsequent boot processes take into account prior boot processes and changes by a user (e.g. loading a new application program or an extension). These changes alter the boot process and will be automatically accounted for by the exemplary method because it observes what data are needed for a boot process, and if these data change, then the method changes the control data to take into account the change in the boot process.

A second OS boot begins at block 210. At block 210 during a second, subsequent OS boot, a cache is populated using a set of control data compiled during the first OS boot. In one embodiment, the cache may be a bootcache which is physically located within a RAM. By populating a cache, data is moved into a cache memory from a mass memory. The cache is populated using the control data that was recorded during the first OS boot in block 208. The control data file contains the physical addresses of data that may be necessary during the second OS boot. During the second boot, the OS can use the control data to directly access the data on the mass memory device, and then copy that data from the mass memory device into a cache, such as a bootcache. The cache may be populated early in the boot process in order to make the data, which will be copied into the cache, available for the boot process when the boot process will require the data.

In block 212, the operating system reads data necessary for the second OS boot from the cache and from a storage device. As explained with regards to block 210, the cache is populated with data which was required during a previous boot. This data will be made available to the second boot process, and in block 212, during the second OS boot, the OS typically will access at least one datum from the cache. Often a user, the OS, or another program will in some way alter the boot sequence. A user may, for example, install new hardware which would require a new extension to be loaded during a boot process. Because of these changes to a system, an operating system will often not boot in an identical manner, requiring identical accesses to data during subsequent boots. Because a second OS boot may not be identical to a first OS boot, data necessary for the second OS boot may not be included in the set of control data. Therefore, the second OS boot process may need to access a storage device, such as a mass memory, to retrieve the data necessary to complete the boot. However, during normal system usage any accesses to a mass memory will usually be minimal because system settings are infrequently changed, and successive boots will often be nearly identical.

When these changes are made to the boot sequence, they will not have been recognized in the control data compiled during a previous boot. The operating system can compile statistics based on the performance of the cache. During the boot sequence the operating system can use these statistics to determine whether to continue using the control data, or whether to abandon it and create a new control data which more accurately reflects the data needed by the boot sequence. In block 214, a set of cache statistics based on the performance of the cache is recorded. These statistics reflect how accurate the control data was, and can be used to improve the current second OS boot, and can also be used to improve sets of control data created for subsequent boots. These statistics will be discussed further below.

In block 216, the cache statistics determined in block 214, the control data from the first OS boot, and the control data from the current OS boot are merged into a second set of control data that will be used during the next OS boot. The cache statistics and the control data are combined to reflect the new disk accesses which were necessary during the current boot sequence. The cache statistics indicate to the operating system how accurate the first set of control data was, and whether the first set of control data should be taken into account when creating the new set of control data. In block 218 the process is completed and the computer system is ready for a user.

Previous implementations of a caching system used during a boot sequence have been tightly integrated with the operating system's file system. The previous implementations would send a request to the file system for a specific item of data, and the file system would retrieve the data for the operating system. As a result, the file system would have to be loaded and mounted before caching could begin. Also, sending requests to the file system adds a layer of complexity which increases access, and therefore boot times. By accessing the data directly (and independently of the OS's file system) by referencing its physical location, the process 200 is more efficient and quicker. Further, because the reference is to a physical location on a disk rather than a file system request, the process 200 can be implemented independent of an operating system, and can be portable to many operating systems. Also, the process 200 can cache data necessary to launch the file system. Thus, a computer that is bootable into several different operating systems may use embodiments of the invention to boot into any of those different operating systems.

Figure 4:
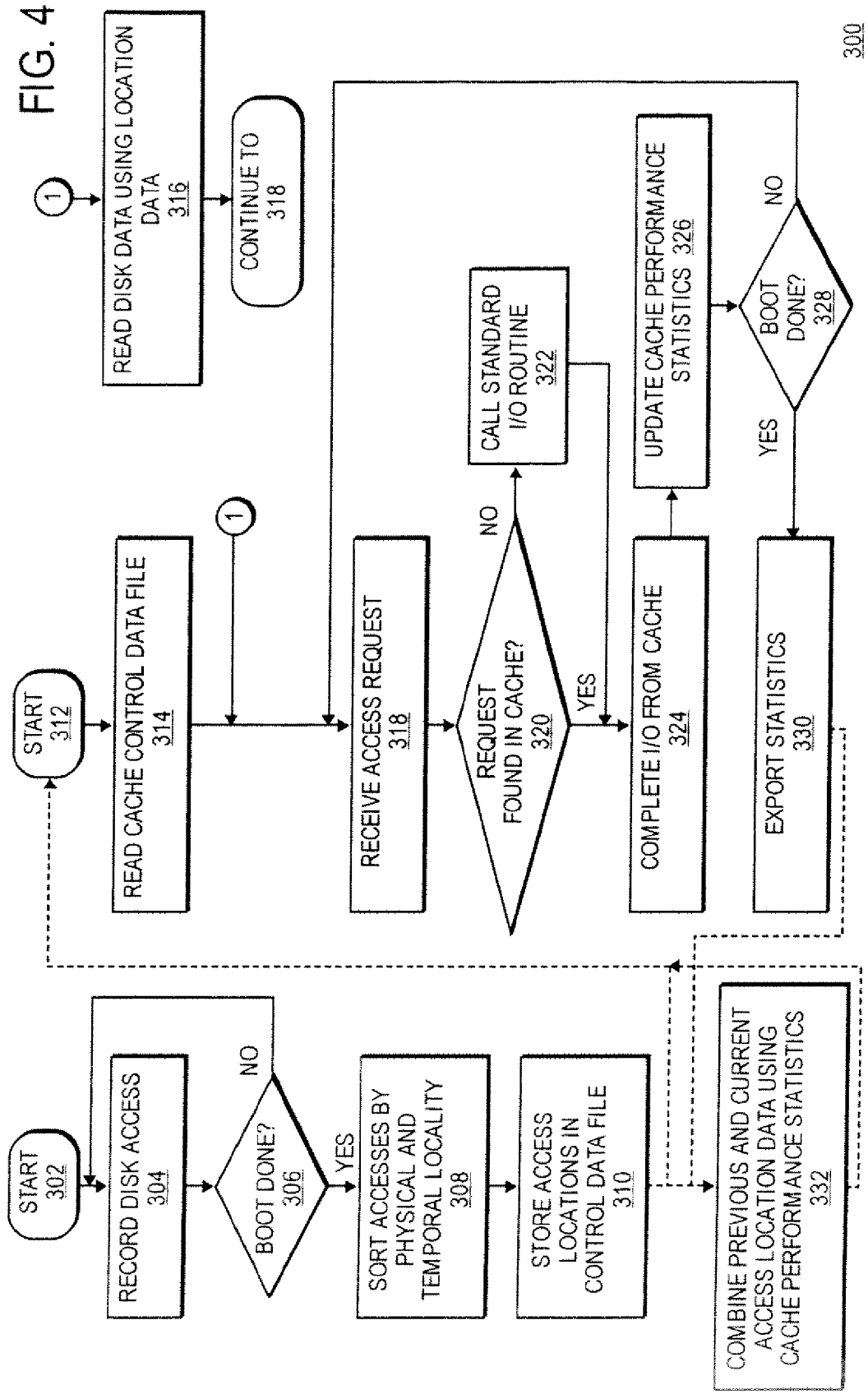
FIG. 4 is a flowchart illustrating successive boot sequences.

FIG. 4 is a flowchart illustrating successive boot sequences. The first boot sequence (which may be from a prior boot process) occurs from blocks 302 to 310. The second boot sequence occurs from blocks 312 to 332. The system is powered on for the first boot sequence at the start block 302. At block 304 an access to a disk is recorded. This access to a disk is typically a read to retrieve data necessary for the first boot sequence. As noted above, the recording of the disk access refers to recording a physical location on the disk. At block 306 if the boot sequence is not done, the process 300 returns to block 304 where the physical location of the next disk access is recorded. Disk accesses are recorded until the boot is complete. If the boot is done, the process 300 moves on to block 308.

At block 308, the recorded accesses are sorted by physical and temporal locality, as discussed above. This sorting will be discussed further in FIG. 5. At block 310, the access locations are stored in a control data file. The access locations refer to the physical locations of operating system disk accesses. The control data file will be used by subsequent boot sequences, including the second boot sequence in blocks 312 to 332, to improve boot time.

The second boot sequence begins at start block 312. At block 314, an initially loaded portion of the operating system reads the cache control data file. This initially loaded portion may be stored in the mass memory and loaded onto RAM in order to execute the method of FIG. 4 or stored in ROM (read only memory) as part of the system's BIOS. As noted above, the cache control data file contains a list of the physical locations of disk accesses that were required by the system during the previous OS boot. The OS will use the control data file during the parallel operation 1 in block 316. At block 316 the operating system reads the disk data from the mass memory (e.g., a hard disk drive) using the location information from the control data file. In block 316, the cache is populated using the control data file in order to provide the operating system with data that can be used during the boot sequence. The cache may be a bootcache (e.g., the bootcache 166), such as was explained above.

Returning to the main flow sequence, at block 318, the operating system makes an access request for data to the computer system and the computer system receives the access request. At block 320, the system tries to find the requested data in the populated cache (e.g., in the bootcache 166). In one embodiment, the cache is populated in block 316 simultaneously while requests are being made from the cache. In this embodiment, the OS needs to make sure that data needed early on in the boot sequence is read into the cache first. This will be further discussed later regarding FIG. 5. If the data is not found in the cache (as determined in block 320), the process moves on to block 322 and a standard I/O routine is called. The standard I/O routine will retrieve the needed data from a mass storage device. The I/O routine will increase the amount of time necessary to complete the boot because an access to a mass storage device is more time consuming than an access to a memory such as RAM with its bootcache 166. However, because any given OS boot is generally very similar to prior boots, during a typical boot sequence only approximately five percent of access requests will have to be read from a mass storage device. The remaining data should be found in the cache. If the data is found in the cache, the process moves on to block 324 where the I/O is completed from the cache. When the I/O is made from the cache, the data, in one embodiment, is moved into to a file system cache or some other location in the RAM or other main memory of the system. The file system cache is subset of memory that retains recently used information for quick access.

As noted above, the bootcache is heuristic and can update the control data file to track changes in the boot sequence. At block 326 the operating system updates the cache performance statistics. These statistics measure the success rate of the control data file, depending on the number of cache misses that happened during the boot sequence. A cache miss occurs in block 320 when the requested data is not found in the cache. The fewer cache misses during the boot sequence, the faster the boot will occur. A cache miss requires an operating system to interrupt a read pass to obtain the required data. These interruptions can increase boot times significantly since the drive is forced to reposition the head. While updating the cache performance statistics, the operating system can monitor the performance of the cache, and can decide whether to continue using the caching functions. It will be appreciated that block 318 may include an operation which records all disk access during the current boot process in order to create a current control data file which may be used for future boot processes.

The operating system may record several different statistics to indicate the success and efficiency of the cache. In one embodiment the statistics may include the recorded playlist size (playlist_size), the number of blocks read from the disk (read_blocks), the number of blocks read from the disk and not requested (spurious_blocks), the number of blocks requested and found in the cache (hit_blocks), and the number of block requested (requested_blocks). As noted above, the control data file may also be referred to as the playlist, and therefore the statistic playlist_size refers to the size of the control data file.

The recorded statistics may be used in the following manner. First, during the operation of the bootcache, the operating system may monitor the ratio of hit_blocks to requested_blocks to determine if a large number of the requested blocks are not being found in the bootcache. If the ratio is below a predetermined threshold, the cache can be said to be inefficient and the operating system may choose to abort all caching functions and discard the cache. In this case the recording of disk accesses would continue and a new control data file would be accumulated for the subsequent boot.

Once the recoding of accesses is completed, the statistic playlist_size is compared with the size of the previous playlist. If the size of the newly recorded cache control data file is smaller by a determined margin, then the previous cache control data file is discarded and the previous and current cache data files are not merged. As a result, the current cache control data file will be used in the subsequent boot without considering the contents of the previous cache control data file. If the previous control data file is too large, it will be too different from the current control data file and useless to the operating system.

If it is determined that the previous cache control data file is not too much larger than the current cache control data file, then the spurious_blocks and read_blocks statistics are compared and a ratio is determined. This ratio will determine how many of the blocks read into the bootcache were unneeded. If the ratio is too high, the previous control data file is discarded, the previous control data tile and the current control data file are not merged, and the current control data file is used in a subsequent boot process.

Once it has been determined that the current control data file is not too small and the previous control data file did not cache too many unneeded blocks, the ratio of hit_blocks and requested_blocks is computed. If the ratio is too low, then it can be determined that too few of the requested blocks were found in the bootcache and the previous control data file is discarded without merging it with the current control data file. In one embodiment, if any of the ratios deviate too far from the norm it can be determined that the previous control data file is no longer useful because substantial system changes have occurred. If this is the case, the previous control data file may be discarded, and the current control data file can be used for the next boot rather than merging it with the previous control data file. In one embodiment, the operating system is aggressive about discarding previous control data files and using entirely new control data files for subsequent boots.

At block 328, if the boot process is not done, the process moves back to block 318 and a new access request is issued. If the boot process is done, the process moves on to block 330 where the statistics are exported. Then, in block 332, the previous and current access location data found in the control data files are combined using the cache performance statistics. In essence, the access information collected during the current boot is compared to and combined with the control data file from the previous boot using the cache statistics in order to make the next boot more accurate and efficient. In this way, the process of using a bootcache can be refined over time by adding to and changing previous control data files rather than compiling a new file during every boot. As noted above, if a boot sequence changes too much over the previous sequence, the operating system may discard the previous control data file, and use a new control data file.

Figure 5:
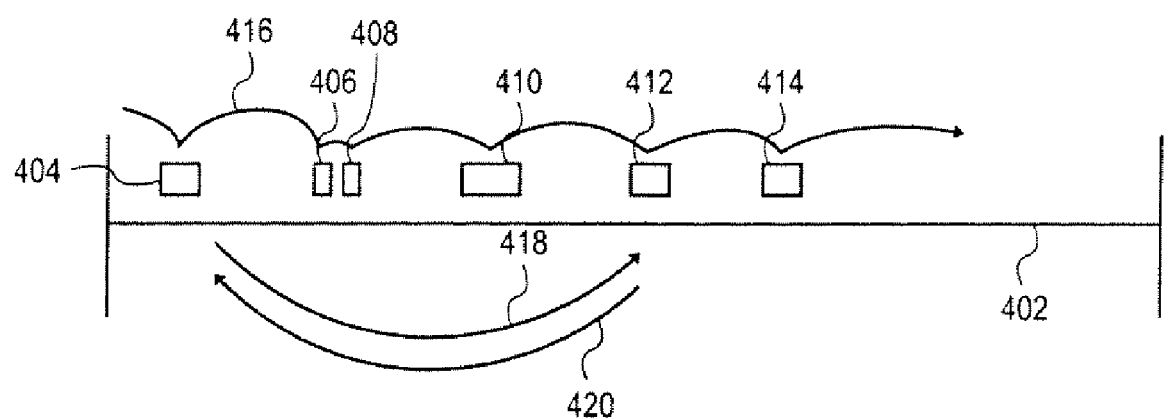
FIG. 5 illustrates a linear read pass on a disk.

FIG. 5 illustrates a linear read pass on a disk. A disk 402 may be a mass storage device such as a hard drive or a CD-ROM. Blocks of data 404, 406, 408, 410, 412 and 414 are data that are required by the operating system during a boot. From the left side of the drive 402 to the right side of the drive 402 the blocks 404-414 are physically ordered. In other words, during one read pass, block 404 would be the first block read and block 414 would be the last block read and the remaining blocks would be read in a sequence from left to right A disk read pass 416 illustrates the disk making a read pass of blocks 404-414 in a single direction. It is advantageous to reduce the total distance traveled by the disk head, because this will ultimately lead to a reduction in the amount of time necessary to complete the boot process.

If the operating system needs a block of data that is not found during the read pass 416, the disk head may have to be repositioned to initiate another read to retrieve the data. This is illustrated using arrows 418 and 420. Say, for example, that the OS is populating the bootcache while data is being read out of the bootcache for the boot sequence. While the disk is reading block 412, the operating system experiences a cache miss, that is, the operating system needs a piece of data which is not in the cache. The operating system and the disk must find the data needed, for example, by following the arrow 418, and then the disk must return to the point at which it left off by following the arrow 420. This interrupts the read pass 416 and introduces extra disk head travel distance, which will increase boot time. Therefore, it is advantageous to reduce the number of cache misses in order to increase overall boot speed. However, because the data needed to boot an OS is typically very similar from one boot to another, there should be relatively few cache misses.

Figure 6A:
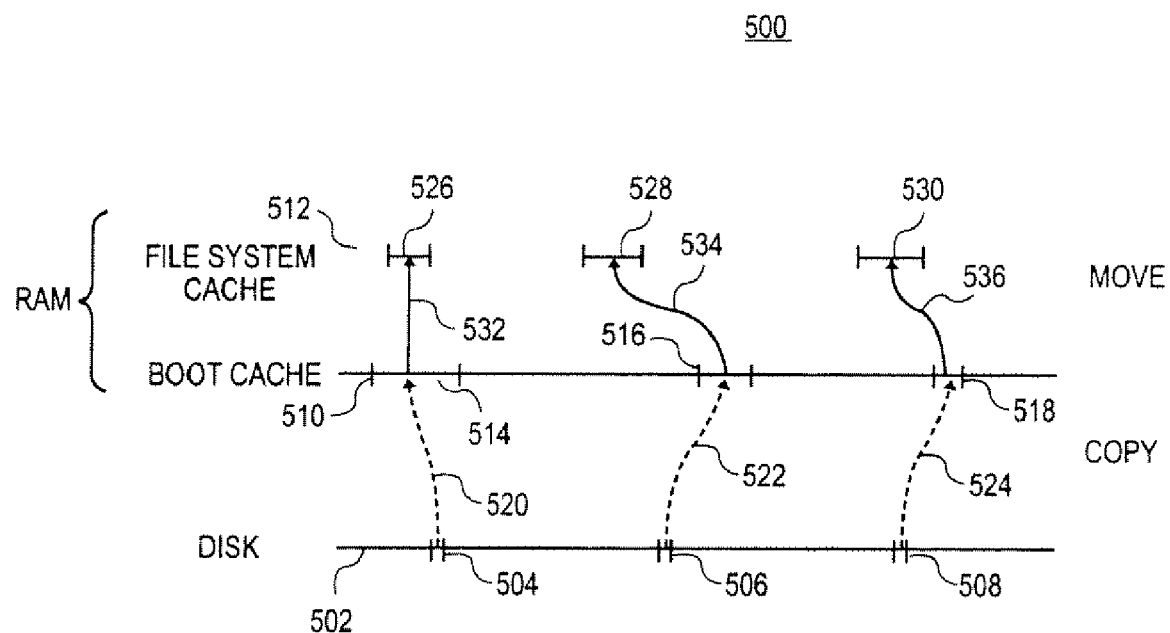
FIG. 6a illustrates populating a cache and reading from a cache.

FIG. 6a illustrates populating a cache and reading from a cache. A mass storage device (e.g., the mass memory 154) such as a disk 502 has blocks of data 504, 506, and 508. The bootcache 510 and the file system cache 512 are logical structures located within a RAM (e.g., the RAM 152) or other memory. It is apparent that the bootcache 510 may also be located within a memory separate from the file system cache.

When populating the bootcache 510 the operating system reads from the disk 502. For example, a block of data 504 is copied from the disk 502 to a temporary storage in the bootcache 510 at a memory cell 514. Likewise, the block of data 506 is copied to the memory cell 516, and the block of data 508 is copied to the memory cell 518. This is further represented by the arrows 520, 522, and 524. In copying data from the disk 502 to the bootcache 510, the system does not erase the data from the disk 502 because during a copy operation a duplicate of the data is made in the bootcache. The disk 502 is a non-volatile memory, and needs to retain the data for future usage.

When reading from the bootcache 510 into the file system cache 512, the data in the memory cells 514, 516, and 518 are moved into file system cache memory cells 526, 528, and 530, respectively, as indicated by the lines 532, 534, and 536. When the data is moved from the bootcache 510 to the file system cache 512, a copy is made in the file system cache 512, and the data in the bootcache 510 is erased. This is known as a move operation. Once the data has been read from the bootcache 510, the bootcache 510 no longer needs to retain a copy of the data, and so the data may be moved to the file system cache and then deleted. This is known as a "toss as you go" process, where the data is erased from the bootcache once it is read and no longer needed. Once the boot sequence is completed, the bootcache 510 will no longer be needed, so the bootcache 510 can then be destroyed (e.g. erased completely), thereby creating room in the RAM for other data to be stored.

Figure 6B:
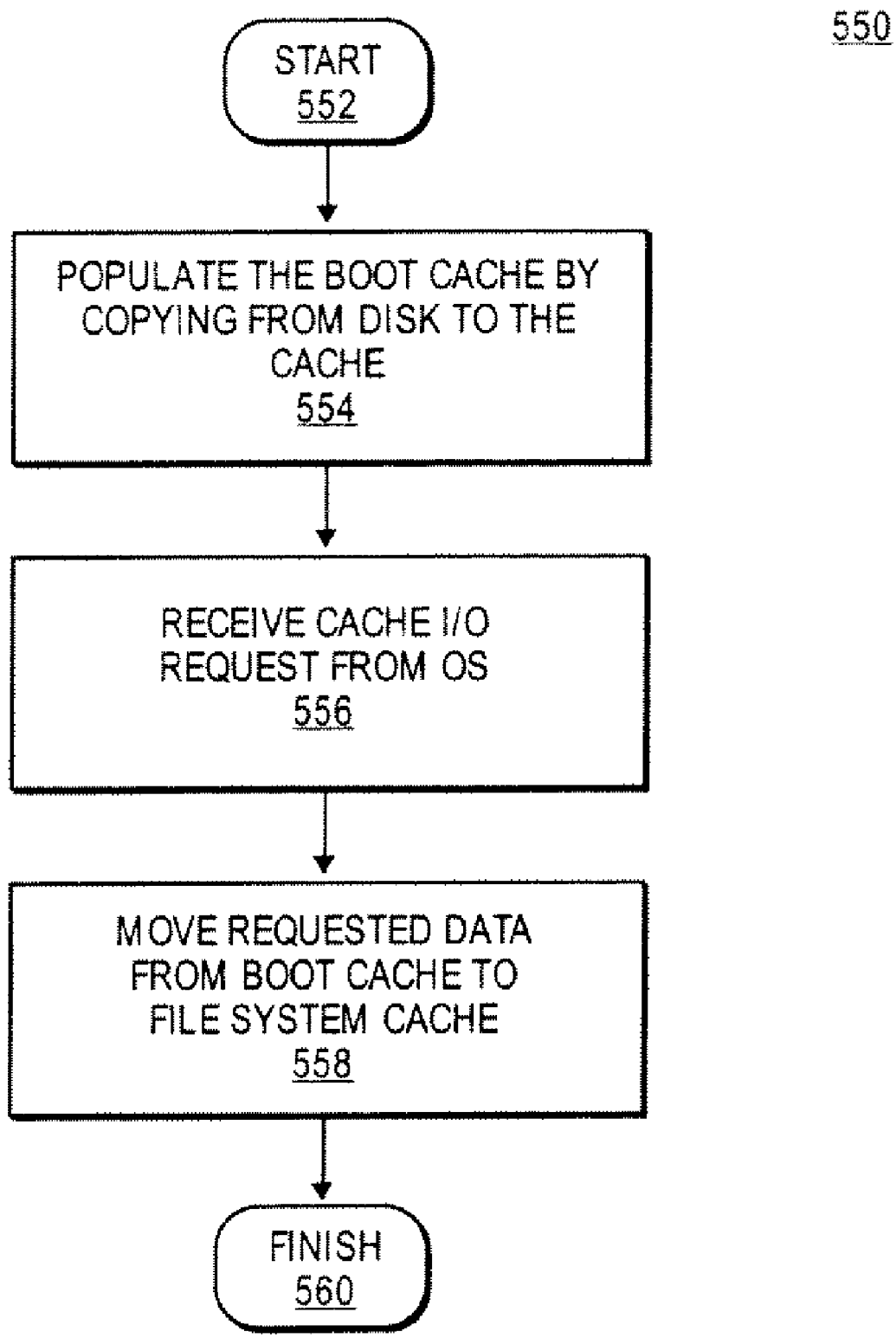
FIG. 6b is a flowchart illustrating the "toss as you go" process.

FIG. 6b is a flowchart illustrating the "toss as you go" process. The process 550 starts at block 552. At block 554 data is copied from the disk to the bootcache and the bootcache is populated. At block 556 the OS makes an I/O request to the bootcache. In block 558 the data is moved from the bootcache to the file system cache. As noted above, in block 558, when the data are moved they are erased from the bootcache while a copy of the data is now in another location in RAM (e.g. in the file system cache). This is referred to as "toss as you go". Once the boot is complete the bootcache may be destroyed. The process finishes in finish block 560.

FIG. 7 illustrates a marker to separate two read passes during a boot process. It may be helpful during a boot process to execute multiple read passes. Data that are physically and logically located near the end of a disk may be needed early in the boot process. Therefore, if a single read pass is made, data that are required near the beginning of a boot sequence may not be read before they are needed. To remedy this problem, the operating system can make multiple read passes, and can ensure that the data needed early on in the boot sequence are read during the first read passes.

This can be illustrated using FIG. 7. Disk 602 represents physical locations on a disk. For example, the left end of disk 602 can be the logical beginning of a disk and the right end of the disk 602 can be the logical end of the disk, as in FIG. 2d. Blocks 604, 606, 608, 610 and 612 are physically ordered on the disk 602. Data block 1 604, data block 10 606, data block 17 607, data block 28 608, and data block 49 610 all represent blocks of data which will be needed by a boot process. As can be seen, as the data block numbers increase the data block is physically located further from the beginning of the disk 602. In one embodiment, if the operating system were to make a single read pass of these data blocks 604-612, the disk would start reading at data block 1 604 and finish with data block 49 612. The data in these blocks will not be available to the OS until the read pass is completed. However, if data block 49 612 is needed early in the boot process, then the single read may not be finished before data block 49 612 is required. This can be illustrated using a time line 614, which starts at the left, ends at the right, and lists the data blocks which will be needed, in the order in which they will be needed. As can be seen, the data block 49 612 is physically the closest to the logical end of the disk 602. So if the disk makes a single read from the beginning of the disk 602 to the end of the disk 602, then the data block 49 612 would be the last data block read during that single read pass. However, as can be seen by looking at the time line 614, the data block 49 612 is required early on during the boot process. Therefore, if the disk makes a single read pass, the data block 49 612 may not be read into the bootcache before it is needed during the boot process.

To solve this problem, an operating system may instruct a disk to make two separate and distinct read passes. What is read during the first and second read passes can be partitioned by a marker 616. All data needed up to marker 616 can be read during a first read pass into the bootcache and any data needed after marker 616 can be read during a second read pass into the bootcache (or a second bootcache). For example, data blocks 10 606 and 49 612 appear before the marker 616. So a disk could read blocks 10 606 and 49 612 during a first pass. Therefore, the first read pass would be completed and data block 49 610 would be available early in the boot process. The second read pass would read data blocks 17 608, 1 604, and 28 608, which are required later in the boot process. In this way, the operating system can minimize the number of read passes required while still having necessary data available to the boot process when they are needed. By minimizing the number of read passes required, the operating system will also minimize the required boot time.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A computer-implemented method booting an operating system (OS) of a data processing system, the method comprising:
    recording, by the OS, information concerning one or more first physical locations of a storage disk of the data processing system used by one or more disk accesses during a first OS boot;
    storing the recorded information in a set of control data in a storage device within the data processing system;
    during a second OS boot, retrieving, by the OS, data stored at the one or more first physical locations of the storage disk based on the set of control data, prior to booting an operational file system of the OS, wherein the data is retrieved from the one or more first physical locations of the storage disk without using the operational file system of the OS;
    storing the retrieved data in a cache memory of the data processing system, wherein the cache memory is allocated from a system memory of the data processing system; and
    subsequently initializing at least one component of the OS during the second OS boot using the data stored in the cache memory of the data processing system without having to perform another disk access to the storage disk in order to obtain the same data in order to initialize the at least one component of the OS.

2. The method of claim 1, further comprising sorting the information concerning the one or more first physical locations of the storage disk according to a physical locality of the one or more first physical locations such that a subsequent disk access based on the sorted information during the second OS boot can be performed without having to position a read/write head of the storage disk back and forth.

3. The method of claim 1, further comprising sorting the information concerning the one or more first physical locations of the storage disk according to a temporal locality order, wherein the temporal locality order represents a piece of data's positions in a list of data needed during the second OS boot, starting with the first piece of data.

4. The method of claim 1, further comprising sorting the information concerning the one or more first physical locations of the storage disk according to a physical locality of the one or more first physical locations and a temporal locality representing a piece of data's positions in a list of data needed during the second OS boot, starting with the first piece of data, such that disk access of the second OS boot is further optimized.

5. The method of claim 1, wherein the cache memory is located within a random access memory (RAM) of the data processing system, and wherein the set of control data is stored in the storage disk of the data processing system.

6. The method of claim 5, further comprising:
    in response to an input and output (TO) request for accessing data stored in the cache memory, returning the requested data to an IO system of the OS if the requested data is found in the cache memory; and
    moving the requested data from the cache memory to a second cache memory within the RAM, wherein the second cache memory is configured to retain recently used information for quick access.

7. The method of claim 5, further comprising releasing the cache memory back to the RAM after the second OS boot is completed such that an amount of memory associated with the cache memory can be used as part of the RAM during normal operations of the OS.

8. The method of claim 1, further comprising:
    performing a cache access in the cache memory to obtain data necessary to initialize the at least one component of the OS during the second OS boot;
    in response to a cache miss of the cache access to the cache memory, performing a second disk access to the storage disk to retrieve the data necessary to initialize the at least one component of the OS, wherein the set of control data is updated in view of the second disk access.

9. The method of claim 1, further comprising:
    monitoring cache accesses of the cache memory during the second OS boot; and
    computing cache performance statistics representing a success rate of the set of control data based on an amount of cache misses during the second OS boot.

10. The method of claim 9, further comprising aborting usage of the set of control data during the second OS boot if the cache performance statistics do not satisfy a predetermined threshold.

11. The method of claim 1, wherein the at least one component of the OS is a file system of the OS, and wherein the cache memory is populated based on the set of control data prior to loading the file system.

12. The method of claim 11, wherein data retrieved from the one or more first physical locations of the storage disk and stored in the cache memory includes data representing files associated with the file system.

13. A machine-readable storage medium having machine instructions stored therein, which when executed by a machine, cause the machine to perform a method booting an operating system (OS) of a data processing system, the method comprising:
    recording, by the OS, information concerning one or more first physical locations of a storage disk of the data processing system used by one or more disk accesses during a first OS boot;
    storing the recorded information in a set of control data in a storage device within the data processing system;
    during a second OS boot, retrieving, by the OS, data stored at the one or more first physical locations of the storage disk based on the set of control data, prior to booting an operational file system of the OS, wherein the data is retrieved from the one or more first physical locations of the storage disk without using the operational file system of the OS;

storing the retrieved data in a cache memory of the data processing system, wherein the cache memory is allocated from a system memory of the data processing system;

subsequently initializing at least one component of the OS during the second OS boot using the data stored in the cache memory of the data processing system without having to perform another disk access to the storage disk in order to obtain the same data in order to initialize the at least one component of the OS; and releasing the cache memory back to the system memory after the second OS boot has been completed.

14. The machine-readable storage medium of claim 13, further comprising sorting the information concerning the one or more first physical locations of the storage disk according to a physical locality of the one or more first physical locations such that a subsequent disk access based on the sorted information during the second OS boot can be performed without having to position a read/write head of the storage disk back and forth.

15. The machine-readable storage medium of claim 13, further comprising sorting the information concerning the one or more first physical locations of the storage disk according to a temporal locality order, wherein the temporal locality order represents a piece of data's positions in a list of data needed during the second OS boot, starting with the first piece of data.

16. The machine-readable storage medium of claim 13, further comprising sorting the information concerning the one or more first physical locations of the storage disk according to a physical locality of the one or more first physical locations and a temporal locality representing a piece of data's positions in a list of data needed during the second OS boot, starting with the first piece of data, such that disk access of the second OS boot is further optimized.

17. The machine-readable storage medium of claim 13, wherein the cache memory is located within a random access memory (RAM) of the data processing system, and wherein the set of control data is stored in the storage disk of the data processing system.

18. The machine-readable storage medium of claim 17, wherein the method further comprises:

in response to an input and output (TO) request for accessing data stored in the cache memory, returning the requested data to an IO system of the OS if the requested data is found in the cache memory; and moving the requested data from the cache memory to a second cache memory within the RAM, wherein the second cache memory is configured to retain recently used information for quick access.

19. The machine-readable storage medium of claim 17, wherein the method further comprises releasing the cache memory back to the RAM after the second OS boot is completed such that an amount of memory associated with the cache memory can be used as part of the RAM during normal operations of the OS.

20. The machine-readable storage medium of claim 13, wherein the method further comprises:

performing a cache access in the cache memory to obtain data necessary to initialize the at least one component of the OS during the second OS boot;

in response to a cache miss of the cache access to the cache memory, performing a second disk access to the storage disk to retrieve the data necessary to initialize the at least one component of the OS, wherein the set of control data is updated in view of the second disk access.

21. The machine-readable storage medium of claim 13, wherein the method further comprises:

monitoring cache accesses of the cache memory during the second OS boot; and computing cache performance statistics representing a success rate of the set of control data based on an amount of cache misses during the second OS boot.

22. The machine-readable storage medium of claim 21, wherein the method further comprises aborting usage of the set of control data during the second OS boot if the cache performance statistics do not satisfy a predetermined threshold.

23. The machine-readable storage medium of claim 13, wherein the at least one component of the OS is a file system of the OS, and wherein the cache memory is populated based on the set of control data prior to loading the file system.

24. The machine-readable storage medium of claim 23, wherein data retrieved from the one or more first physical locations of the storage disk and stored in the cache memory includes data representing files associated with the file system.

25. A data processing system, comprising:
a processor;
a storage disk; and
a memory coupled to the processor and the storage disk to store instructions representing at least a portion of an operating system (OS), which when executed from the memory, cause the processor to record, via the OS, information concerning one or more first physical locations of the storage disk used by one or more disk accesses during a first OS boot, store the recorded information in a set of control data in the storage disk, during a second OS boot, retrieve, via the OS, data stored at the one or more first physical locations of the storage disk based on the set of control data, prior to booting an operational file system of the OS, wherein the data is retrieved from the one or more first physical locations of the storage disk without using the operational file system of the OS, store the retrieved data in a cache memory, wherein the cache memory is allocated from a system memory of the data processing system, subsequently initialize at least one component of the OS during the second OS boot using the data stored in the cache memory without having to perform another disk access to the storage disk in order to obtain the same data in order to initialize the at least one component of the OS, and release the cache memory back to the system memory after the second OS boot has been completed.

26. The system of claim 25, wherein the information concerning the one or more first physical locations of the storage disk is sorted according to a physical locality of the one or more first physical locations such that a subsequent disk access based on the sorted information during the second OS boot can be performed without having to position a read/write head of the storage disk back and forth.

27. The system of claim 25, wherein the information concerning the one or more first physical locations of the storage disk is sorted according to a temporal locality order, wherein the temporal locality order represents a piece of data's positions in a list of data needed during the second OS boot, starting with the first piece of data.

28. The system of claim 25, wherein the information concerning the one or more first physical locations of the storage disk is sorted according to a physical locality of the one or more first physical locations and a temporal locality representing a piece of data's positions in a list of data needed during the second OS boot, starting with the first piece of data, such that disk access of the second OS boot is further optimized.

29. The system of claim 25, wherein the cache memory is located within a random access memory (RAM) of the data processing system, and wherein the set of control data is stored in the storage disk of the data processing system.

30. The system of claim 29, wherein in response to an input and output (IO) request for accessing data stored in the cache memory, the requested data is returned to an IO system of the OS if the requested data is found in the cache memory, and wherein the requested data from the cache memory is moved to a second cache memory within the RAM, wherein the second cache memory is configured to retain recently used information for quick access.

31. The system of claim 29, wherein the cache memory is released back to the RAM after the second OS boot is completed such that an amount of memory associated with the cache memory can be used as part of the RAM during normal operations of the OS.

32. The system of claim 25, wherein the OS performs a cache access in the cache memory to obtain data necessary to initialize the at least one component of the OS during the second OS boot, and wherein in response to a cache miss of the cache access to the cache memory, the OS performs a second disk access to the storage disk to retrieve the data necessary to initialize the at least one component of the OS, wherein the set of control data is updated in view of the second disk access.

33. The system of claim 25, wherein the OS monitors cache accesses of the cache memory during the second OS boot and computes cache performance statistics representing a success rate of the set of control data based on an amount of cache misses during the second OS boot.

34. The system of claim 33, wherein the OS aborts using the set of control data during the second OS boot if the cache performance statistics do not satisfy a predetermined threshold.

35. The system of claim 25, wherein the at least one component of the OS is a file system of the OS, and wherein the cache memory is populated based on the set of control data prior to loading the file system.

36. The system of claim 35, wherein data retrieved from the one or more first physical locations of the storage disk and stored in the cache memory includes data representing files associated with the file system.

37. An apparatus for booting an operating system (OS) of a data processing system, the apparatus comprising:
means for recording, via the OS, information concerning one or more first physical locations of a storage disk of the data processing system used by one or more disk accesses during a first OS boot;
means for storing the recorded information in a set of control data in a storage device within the data processing system;
means for during a second OS boot, retrieving, via the OS, data stored at the one or more first physical locations of the storage disk based on the set of control data, prior to booting an operational file system of the OS, wherein the data is retrieved from the one or more first physical locations of the storage disk without using the operational file system of the OS;
means for storing the retrieved data in a cache memory of the data processing system, wherein the cache memory is allocated from a system memory of the data processing system;
means for subsequently initializing at least one component of the OS during the second OS boot using the data stored in the cache memory of the data processing system without having to perform another disk access to the storage disk in order to obtain the same data in order to initialize the at least one component of the OS; and
releasing the cache memory back to the system memory after the second OS boot has been completed.

38. A computer-implemented method booting an operating system (OS) of a data processing system, the method comprising:
recording, by the OS, information concerning one or more first physical locations of a storage disk of the data processing system used by one or more disk accesses during a first OS boot;
storing the recorded information in a set of control data in a storage device within the data processing system;
during a second OS boot, retrieving, by the OS, data stored at the one or more first physical locations of the storage disk based on the set of control data, prior to booting a file system of the OS, wherein the data retrieved from the one or more first physical locations of the storage disk includes data representing one or more files of the file system;
storing the retrieved data in a cache memory of the data processing system, wherein the cache memory is allocated from a system memory of the data processing system;
loading the file system of the OS using the data stored in the cache memory of the data processing system without having to perform another disk access to the storage disk in order to obtain the same data in order to initialize the file system of the OS; and
releasing the cache memory back to the system memory of the data processing system.

39. The method of claim 38, further comprising:
recording information concerning one or more second physical locations of one or more disk accesses during the second OS boot; and
updating the set of control data in view of the recorded information concerning the one or more second physical locations, wherein the updated set of control data is used during a third OS boot to prefetch data from the storage disk into the cache memory which is used to boot at least one component of the OS to reduce disk access during the third OS boot.

40. The method of claim 39, further comprising sorting the information concerning the one or more first physical locations of the storage disk according to a physical locality of the one or more first physical locations such that a subsequent disk access based on the sorted information during the second OS boot can be performed without having to position a read/write head of the storage disk back and forth.

41. The method of claim 39, further comprising sorting the information concerning the one or more first physical locations of the storage disk according to a temporal locality order, wherein the temporal locality order represents a piece of data's positions in a list of data needed during the second OS boot, starting with the first piece of data.

42. The method of claim 39, further comprising sorting the information concerning the one or more first physical locations of the storage disk according to a physical locality of the one or more first physical locations and a temporal locality representing a piece of data's positions in a list of data needed during the second OS boot, starting with the first piece of data, such that disk access of the second OS boot is further optimized.

43. The method of claim 39, wherein the cache memory is located within a random access memory (RAM) of the data processing system, and wherein the set of control data is stored in the storage disk of the data processing system.

44. The method of claim 43, further comprising:
in response to an input and output (TO) request for accessing data stored in the cache memory, returning the requested data to an IO system of the OS if the requested data is found in the cache memory; and
moving the requested data from the cache memory to a second cache memory within the RAM, wherein the second cache memory is configured to retain recently used information for quick access.

45. The method of claim 43, further comprising releasing the cache memory back to the RAM after the second OS boot is completed such that an amount of memory associated with the cache memory can be used as part of the RAM during normal operations of the OS.

46. The method of claim 39, further comprising:
performing a cache access in the cache memory to obtain data necessary to initialize the at least one component of the OS during the second OS boot;
in response to a cache miss of the cache access to the cache memory, performing a second disk access to the storage disk to retrieve the data necessary to initialize the at least one component of the OS, wherein the set of control data is updated in view of the second disk access.

47. The method of claim 39, further comprising:
monitoring cache accesses of the cache memory during the second OS boot; and
computing cache performance statistics representing a success rate of the set of control data based on an amount of cache misses during the second OS boot.

48. The method of claim 47, further comprising aborting usage of the set of control data during the second OS boot if the cache performance statistics do not satisfy a predetermined threshold.

49. The method of claim 39, wherein the at least one component of the OS is a file system of the OS, and wherein the cache memory is populated based on the set of control data prior to loading the file system.

50. The method of claim 49, wherein data retrieved from the one or more first physical locations of the storage disk and stored in the cache memory includes data representing files associated with the file system.

51. A machine-readable storage medium having machine instructions stored therein, which when executed by a machine, cause the machine to perform a method booting an operating system (OS) of a data processing system, the method comprising:
recording, by the OS, information concerning one or more first physical locations of a storage disk of the data processing system used by one or more disk accesses during a first OS boot;
storing the recorded information in a set of control data in a storage device within the data processing system;
during a second OS boot, retrieving, by the OS, data stored at the one or more first physical locations of the storage disk based on the set of control data, prior to booting a file system of the OS, wherein the data retrieved from the one or more first physical locations of the storage disk includes data representing one or more files of the file system;
storing the retrieved data in a cache memory of the data processing system, wherein the cache memory is allocated from a system memory of the data processing system;
loading the file system of the OS using the data stored in the cache memory of the data processing system without having to perform another disk access to the storage disk in order to obtain the same data in order to initialize the file system of the OS; and
releasing the cache memory back to the system memory of the data processing system.

52. The machine-readable storage medium of claim 51, wherein the method further comprises:
recording information concerning one or more second physical locations of one or more disk accesses during the second OS boot; and
updating the set of control data in view of the recorded information concerning the one or more second physical locations, wherein the updated set of control data is used during a third OS boot to prefetch data from the storage disk into the cache memory which is used to boot at least one component of the OS to reduce disk access during the third OS boot.

53. The machine-readable storage medium of claim 52, wherein the method further comprises sorting the information concerning the one or more first physical locations of the storage disk according to a physical locality of the one or more first physical locations such that a subsequent disk access based on the sorted information during the second OS boot can be performed without having to position a read/write head of the storage disk back and forth.

54. The machine-readable storage medium of claim 52, wherein the method further comprises sorting the information concerning the one or more first physical locations of the storage disk according to a temporal locality order, wherein the temporal locality order represents a piece of data's positions in a list of data needed during the second OS boot, starting with the first piece of data.

55. The machine-readable storage medium of claim 52, wherein the method further comprises sorting the information concerning the one or more first physical locations of the storage disk according to a physical locality of the one or more first physical locations and a temporal locality representing a piece of data's positions in a list of data needed during the second OS boot, starting with the first piece of data, such that disk access of the second OS boot is further optimized.

56. The machine-readable storage medium of claim 52, wherein the cache memory is located within a random access memory (RAM) of the data processing system, and wherein the set of control data is stored in the storage disk of the data processing system.

57. The machine-readable storage medium of claim 56, wherein the method further comprises:
in response to an input and output (TO) request for accessing data stored in the cache memory, returning the requested data to an IO system of the OS if the requested data is found in the cache memory; and
moving the requested data from the cache memory to a second cache memory within the RAM, wherein the second cache memory is configured to retain recently used information for quick access.

58. The machine-readable storage medium of claim 56, wherein the method further comprises releasing the cache memory back to the RAM after the second OS boot is completed such that an amount of memory associated with the cache memory can be used as part of the RAM during normal operations of the OS.

59. A data processing system, comprising:
   a processor;
   a storage disk; and
   a memory coupled to the processor and the storage disk to store instructions representing at least a portion of an operating system (OS), which when executed from the memory, cause the processor to
      record, via the OS, information concerning one or more first physical locations of a storage disk of the data processing system used by one or more disk accesses during a first OS boot,
      store the recorded information in a set of control data in a storage device within the data processing system,
      during a second OS boot, retrieve, via the OS, data stored at the one or more first physical locations of the storage disk based on the set of control data, prior to booting a file system of the OS, wherein the data retrieved from the one or more first physical locations of the storage disk includes data representing one or more files of the file system,
      store the retrieved data in a cache memory of the data processing system, wherein the cache memory is allocated from a system memory of the data processing system,
      load the file system of the OS using the data stored in the cache memory of the data processing system without having to perform another disk access to the storage disk in order to obtain the same data in order to initialize the file system of the OS, and
      release the cache memory back to the system memory of the data processing system.

60. The system of claim 59, wherein the instructions when executed further cause the processor to
   record information concerning one or more second physical locations of one or more disk accesses during the second OS boot, and
   update the set of control data in view of the recorded information concerning the one or more second physical locations, wherein the updated set of control data is used during a third OS boot to prefetch data from the storage disk into the cache memory which is used to boot at least one component of the OS to reduce disk access during the third OS boot.

* * * * *